United States Patent [19]

Miller et al.

[11] Patent Number: 5,269,956
[45] Date of Patent: Dec. 14, 1993

[54] COMPATIBLE CORROSION INHIBITOR COMBINATIONS

[75] Inventors: David L. Miller; John M. Larkin, both of Austin, Tex.

[73] Assignee: Texaco Chemical Co., White Plains, N.Y.

[21] Appl. No.: 765,644

[22] Filed: Sep. 25, 1991

[51] Int. Cl.⁵ .................................................. C09K 5/00
[52] U.S. Cl. .................................... 252/67; 252/74; 252/75; 252/76; 422/7
[58] Field of Search ............... 252/75, 76, 67; 422/7

[56] References Cited

U.S. PATENT DOCUMENTS

| | | | |
|---|---|---|---|
| 4,382,008 | 5/1983 | Boreland et al. | 252/75 |
| 4,647,392 | 3/1987 | Darden et al. | 252/75 |
| 4,657,689 | 4/1987 | Darden | 252/75 |
| 4,759,864 | 6/1988 | Van Neste et al. | 252/75 |

*Primary Examiner*—Paul Lieberman
*Assistant Examiner*—Necholus Ogden
*Attorney, Agent, or Firm*—Kenneth R. Priem; James J. O'Loughlin; Henry H. Gibson

[57] ABSTRACT

Solutions of potassium, aliphatic monocarboxylate, hydrocarbyl dicarboxylate and hydrocarbyl triazole, with one or more silicate, phosphate, borate, or nitrate, have superior compatibility and anticorrosion properties, useful in heat transfer fluids, antifreezes and metal corrosion inhibition.

16 Claims, No Drawings

COMPATIBLE CORROSION INHIBITOR COMBINATIONS

BACKGROUND OF THE INVENTION

1. Field of the Invention

This invention concerns corrosion inhibitor combinations, and antifreeze and heat transfer compositions containing such combinations. More particularly, this invention concerns solutions containing potassium, with aliphatic monocarboxylate, hydrocarbyl dicarboxylate, hydrocarbyl triazole, with one or more silicate, phosphate, borate, or nitrate used in corrosion inhibitor compositions and processes.

2. Description of Related Information

Metallic materials used in heat-transfer systems, such as internal combustion engines, undergo corrosive attack from heat transfer fluids, such as aqueous media containing antifreeze. The resulting metal damage, such as pitting and cavitation, causes perforations or other defects which can lead to fluid loss and system failure. Also, corrosion products tend to form insoluble salts which may block coolant passages or reduce heat transfer.

Various corrosion inhibitors have been added to heat transfer fluids to reduce corrosion of metallic systems. U.S. Pat. No. 4,647,392 (Darden et al.) discloses corrosion inhibitors using aliphatic monobasic acids or salts, hydrocarbyl dibasic acids or salts and hydrocarbyl triazole. U.S. Pat. No. 4,657,689 (Darden) discloses corrosion inhibitors containing aliphatic monobasic acids or salts, hydrocarbyl dibasic acids or salts, hydrocarbyl azoles and specific hydrocarbyl alkali metal sulfonates. These carboxylate-containing materials provide excellent corrosion inhibition properties.

Frequently, various corrosion inhibiting formulations or concentrates, such as antifreezes, are combined during use. Typically, antifreeze formulations are added to heat transfer fluids, such as in motor vehicle engine cooling systems, to prepare for winter temperatures and as fluid loss replacement. Commercial antifreeze formulations contain various inhibitor technologies. If two or more antifreezes containing different types of inhibitors are used in one cooling system, a composition having mixtures of the antifreeze formulations is generated.

The effectiveness of mixtures of different corrosion inhibiting formulations will at least in part depend on the compatibility between the components of each formulation. For example, the combination of certain carboxylate-containing corrosion inhibiting compositions with other corrosion inhibiting compositions having silicates, phosphates, borates, nitrates and/or other components, can have limited compatibility. This limited compatibility can result in precipitation of some of the corrosion inhibiting material and/or result in a reduction in corrosion inhibiting properties.

Corrosion inhibiting combinations are therefore needed which are effective in inhibiting corrosion using carboxylate-containing compositions in combination with other materials useful in corrosion inhibiting compositions which combinations are compatible and at least maintain corrosion inhibiting properties.

SUMMARY OF THE INVENTION

This invention concerns corrosion inhibiting compositions and processes. The composition comprises a solution of potassium, aliphatic monocarboxylate having at least about 5 carbon atoms, hydrocarbyl dicarboxylate having at least about 5 carbon atoms, hydrocarbyl triazole, and one or more silicate, phosphate, or borate. Antifreeze compositions comprising freezing point depressant and a corrosion inhibiting amount of such composition are provided. Heat transfer compositions comprising heat transfer fluid and a corrosion inhibiting amount of such composition are also provided. Processes for inhibiting corrosion of metal in contact with heat transfer fluid are also provided which comprise including in the fluid such composition. Processes are also provided for inhibiting corrosion of metal in contact with heat transfer fluid which comprises including in the fluid a corrosion inhibiting composition comprising an aqueous solution of aliphatic carboxylate, hydrocarbyl dicarboxylate, and hydrocarbyl triazole, wherein the improvement comprises adding an amount of potassium which gives increased corrosion inhibition as compared with a corresponding composition in which the potassium is replaced with sodium.

DETAILED DESCRIPTION OF THE INVENTION

Corrosion inhibitor compositions have been discovered which are compatible and provide comparatively superior corrosion inhibition using combinations of several components.

In one embodiment, the corrosion inhibitor composition comprises, and preferably consists essentially of, five or more components in a solvent: (1) potassium; (2) aliphatic monocarboxylate having at least 5 carbon atoms; (3) hydrocarbyl dicarboxylate having at least 5 carbon atoms; (4) hydrocarbyl triazole; and one or more (5) silicate; phosphate; or borate.

The term "hydrocarbyl" is used herein to describe any group having hydrogen and carbon atoms. The hydrocarbyl may be saturated or unsaturated, including aromatic, straight-or branched-chain, cyclic or acyclic, and unsubstituted or substituted, such as with halogen, oxygen, nitrogen, sulfur, phosphorus or other elements.

The potassium component may be provided from any source for potassium cations. Typical sources for potassium include one or mixtures of the following: potassium hydroxide, dipotassium phosphate; potassium silicate; potassium borate; potassium triazole salt; potassium carboxylate salt; and the like. Potassium hydroxide is preferred. The amount of potassium present is any amount which provides the compatibility and improved corrosion inhibition properties of this invention.

Compatibility can be shown by combining the various corrosion inhibiting components in solvent and observing or measuring the absence of precipitate. Improved compatibility can be shown for compositions containing the 5 or more essential components when compared with corresponding compositions where some or all the potassium is replaced with sodium or other cation. Compositions of this invention show improved compatibility under either only a portion or all concentrations and conditions, such as may be found typically in product formulations and during use.

Improved corrosion inhibition can be shown by comparing the corrosion inhibiting properties of the composition with a corresponding composition in which the potassium is replaced with sodium or other cation. Increased corrosion inhibition results shown by the composition with potassium can be based on just one, or on more than one, test. For example, the standard ASTM D-4340 aluminum hot surface test can be used to determine aluminum weight loss. Less aluminum loss, indicating improved corrosion inhibition, can be shown using the composition of this invention.

The particular amount of potassium is not narrowly critical so long as the composition has the compatibility and/or improved corrosion inhibiting properties. Typically, the composition contains at least about 0.1, preferably from about 0.1 to about 3, weight percent potassium.

The monocarboxylate component is a monobasic anion which may be any aliphatic monocarboxylate usually having at least 5, preferably from about 8 to about 20, carbon atoms, which is useful in corrosion inhibiting compositions. The monocarboxylate may be derived from the corresponding acid or its alkali metal, ammonium, amine, or other cationic salt. Typical monocarboxylates include one or mixtures of the following, including corresponding isomers: octanoate; nonanoate; decanoate; undecanoate; dodecanoate; and the like. Octanoates, particularly 2-ethylhexanoate, are preferred. Any alkali metal, ammonium, amine or other suitable cationic group can be used to form the monocarboxylate, provided, however, potassium is present as hereinafter described.

The dicarboxylate component is a dibasic anion which may be any hydrocarbyl dicarboxylate usually having at least 5, preferably from about 8 to about 20, carbon atoms which is useful in corrosion inhibiting compositions. The dicarboxylate may be derived from the dibasic acid or its alkali metal, ammonium, amine or other cationic salt. Typical dicarboxylates include one or mixtures of the following, including corresponding isomers: suberate; azelate; sebacate; undecanedioate; dodecanedioate; dicarboxylate; dicyclopentadiene; terephthalate; and the like. Sebacate is preferred. Any alkali metal, ammonium, amine or other suitable cationic group can be used to form the dicarboxylate, provided, however, potassium is present as hereinafter described.

The triazole component may be any hydrocarbyl triazole useful in corrosion inhibiting compositions. Typical triazoles include one or mixtures of the following: aromatic triazoles, such as tolyltriazole or benzotriazole; and the like. Tolyltriazole is preferred.

The corrosion inhibitor composition has one or more additional components sufficient to show compatibility and/or improved corrosion inhibition due to the presence of potassium. Such components include one or mixtures of the following: silicate, phosphate, borate, nitrate, as well as other equivalent or substantially similar materials.

The silicate component may be any, including known, silicate useful in corrosion inhibiting compositions, such as those described in U.S. Pat. Nos. 4,676,919, 4,684,474, 4,767,599, 4,772,408, 4,775,415, 4,965,334, and 5,000,866, all incorporated herein by reference. Typical silicates include one or mixtures of the following: sodium-metasilicate pentahydrate; sodium-metasilicate nonahydrate; sodium-orthosilicate pentahydrate; anhydrous sodium silicate; and the like. Preferred silicates include sodium silicate pentahydrate.

The phosphate component may be any, including known, phosphate useful in corrosion inhibiting compositions. Typical phosphates include one or mixtures of the following: phosphoric acid; alkali metal phosphates, such as potassium phosphate, dipotassium phosphate; and the like.

The borate component may be any, including known, borate useful in corrosion inhibiting compositions. Typical borates include one or mixtures of the following: boric acid; alkali metal borates, such as potassium borate; and the like.

The nitrate component may be any, including known, nitrate useful in corrosion inhibiting compositions. Typical nitrates include one or mixtures of the following: nitric acid; alkali metal nitrates, such as potassium nitrate; and the like.

The concentration of these components in the corrosion inhibiting composition may be any useful, including known, amount. Typically, the composition has: from about 0.1 to about 15 weight percent monocarboxylate; from about 0.01 to about 15 weight percent dicarboxylate; from about 0.01 to about 1 weight percent triazole; from 0 up to about 0.5 weight percent silicate; from 0 up to about 3 weight percent phosphate; from 0 up to about 2 weight percent borate; and from 0 up to about 0.5 weight percent nitrate.

The essential components, along with any optional components, are provided in a fluid medium which acts as a carrier and solvent for the components. The particular fluid medium may be any fluid useful in corrosion inhibiting compositions and typically is the heat transfer fluid and/or freezing point depressant, as hereinafter described.

The antifreeze composition comprises freezing point depressant and a corrosion inhibiting amount of the corrosion inhibitor combination. A corrosion inhibiting amount is any individual or relative amounts of components which in combination, are useful in corrosion inhibiting compositions, such as within the concentrations previously described. The concentrations of components in the antifreeze, prior to any dilution during use, are not narrowly critical and will typically range as follows: from about 0.5 to about 3 weight percent potassium; from about 0.5 to about 15, preferably to about 8, weight percent monocarboxylate; from about 0.1 to about 15, preferably to about 1.5, weight percent dicarboxylate; from about 0.05 to about 1, preferably to about 0.3, weight percent triazole; and, when present: from about 0.02 to about 0.5 weight percent silicate; from about 0.05 to about 3 weight percent phosphate; from about 0.05 to about 2 weight percent borate; and from about 0.05 to about 0.5 weight percent nitrate.

Any, including known, freezing point depressant can be provided which is useful in heat transfer fluids or other antifreeze applications, such as deicers and the like. Typical freezing point depressants include, among others, one or mixtures of the following: glycols, such as ethylene glycol, diethylene glycol, propylene glycol, dipropylene glycol, and the like; glycol ethers, such as methyl, ethyl, propyl and butyl ethers of ethylene glycol, diethylene glycol, propylene glycol, dipropylene glycol, and the like; and other freezing point depressants. Ethylene glycol is preferred as the major antifreeze component.

The heat transfer composition comprises heat transfer fluid and a corrosion inhibiting amount of the corrosion inhibitor of this invention. Any, including known, heat transfer fluid can be used. Typical heat transfer fluids include, among others, one or mixtures of the following: water; freezing point depressant, including alcohols and so on as described previously; aromatic compounds, such as diphenyl oxides like DOWTHERM ® A, G, J, HT and Q from Dow Chemical Co.; and other heat transfer fluids.

Any other materials, if desired, can be included in the corrosion inhibitor, antifreeze or heat transfer compositions. These materials include, among others, one or more of the following: other corrosion inhibitors, including other aliphatic carboxylic acids or salts; aromatic carboxylates, such as benzoates like sodium benzoate; nitrites, such as sodium nitrite; carbonates, such as sodium carbonate; molybdates; chromates; phosphonates; thiazoles, such as mercaptobenzothiazole; stabilizers, such as organosilanes and the like; pH adjusters, such as sodium hydroxide and the like; or other materials useful in corrosion inhibition, antifreeze or heat transfer fluids.

Processes for inhibiting corrosion of metal in contact with heat transfer fluid comprise adding a corrosion inhibiting amount of the corrosion inhibitor composition to the fluid. The particular manner for adding the corrosion inhibitor to the fluid is not critical and can be any, including known, technique for adding corrosion inhibitors, such as in antifreeze, to heat transfer fluid.

The operating conditions for using the composition and process of this invention are not critical but may be any suitable, including known, conditions for using corrosion inhibitors, antifreeze or heat transfer fluids. Generally, the temperature may range from at least about −60°, preferably from at least about −40° to about 230°, centigrade and the pressure may range from at least ambient, and preferably from up to about 3 atmospheres. The pH of the composition typically ranges from about 7 to about 11, and preferably from about 7.5 to about 10.

The following examples present illustrative embodiments of this invention without intention to limit its scope. All percentages given in the disclosure and claims are in weight percent, unless otherwise stated.

EXAMPLES

Examples 1-3C

Formulation Preparation and Analysis

These examples show how to make and use compositions of this invention, and as compared with control. In Examples 1 and 2, potassium component is provided. In Example 3C, a similar composition is used as control for comparison in which potassium is replaced with sodium.

Each example uses an antifreeze carboxylate-containing formulation containing: 0.20% hydrocarbyl triazole, as given in Table 1; base, as given in Table 1; deionized water, as given in Table 1; 0.252% sebacic acid; 3.24% 2-ethylhexanoic acid; 0.24% of a 20% aqueous solution of polyvinylpyrrolidone, called PVP K90 from GAF Inc.; 0.2% oxyethylene/oxypropylene copolymer called PLURONIC ® L-61 from BASF Inc.; and 0.0008% dye called BASONYL ® Red NB545 from BASF Inc.; and the balance as ethylene glycol. This formulation is mixed with a commercial antifreeze called PRESTONE ® Advanced Formula from First Brands Corporation, analyzed as having 0.48% phosphate, 0.15% nitrate, 0.15% tolyltriazole, 0.12% silicate (based on 0.046% silicon), 0.19% borate (based on 0.052% boron), as well as dye, antifoamant and silicate stabilizer.

Aqueous solutions of the mixtures in all three examples, having 18.75% carboxylate-containing formulation and 6.25% commercial antifreeze, are tested following ASTM D-4340 aluminum hot surface test procedures, with the results given in Table 1.

TABLE 1

Formulation Variations and Test Results

| Example | Triazole | Base | Water | Al Weight Loss[a] |
|---|---|---|---|---|
| 1 | Solid TT[b] | KOH[c] (3.14%) | 0.316% | 0.74, 0.56 |
| 2 | NaTT[d] | KOH[c] (2.90%) | 0.363% | 5.8, 4.6 |
| 3C | NaTT[d] | NaOH[e] (1.93%) | 0.843% | 9.6, 10.1 |

Notes to Table 1:
[a]in milligrams per square centimeter per week
[b]tolyltriazole
[c]45% aqueous potassium hydroxide
[d]50% aqueous sodium tolyltriazole
[e]50% aqueous sodium hydroxide The formulation of Example 3C forms a precipitate within 3 days which does not redissolve during testing. This formulation gives poor aluminum protection of around 10 milligrams per square centimeter per week of aluminum loss. The formulation in Example 2 does not form a precipitate until the sixth day of the test and provides improved aluminum protection. The formulation of Example 1 does not form precipitate and provides significantly improved aluminum corrosion protection.

We claim:

1. A corrosion inhibiting composition comprising a solution containing from about 0.1 to about 3 weight percent potassium, from about 0.1 to about 15 weight percent aliphatic monocarboxylate having at least 5 carbon atoms selected from the group consisting of: octonoate, nonanoate, decanoate, undecanoate, dodecanoate, 2-ethylhexanoate or neodecanoate; from about 0.01 to about 15 weight percent hydrocarbyl dicarboxylate having at least 5 carbon atoms selected from the group consisting of suberate, azelate, sebacate, undecanedioate, dodecanedioate, terephthalate or dicyclopentadiene dicarboxylate; from about 0.01 to about 1 hydrocarbyl triazole selected from the group consisting of tolyltriazole or benzotriazole, and one or more from about 0.02 to about 0.5 weight percent silicate; from 0.05 to about 3 weight percent phosphate; and from about 0.5 to about 2 weight percent borate; and which gives increased corrosion inhibition as compared with corresponding composition in which the potassium is replaced with sodium.

2. The composition of claim 1 wherein the monocarboxylate is 2-ethylhexanoate, the dicarboxylate is sebacate and the triazole is tolyltriazole.

3. The composition of claim 1 containing other corrosion inhibiting compound; buffer; dye; antifoamant; silicate stabilizer; or other material useful in corrosion inhibiting compositions; and mixtures thereof.

4. The composition of claim 3 containing silicate, phosphate, borate, nitrate, dye, antifoamant and silicate stabilizer.

5. An antifreeze composition comprising freezing point depressant and a corrosion inhibiting amount of the composition of claim 1.

6. The antifreeze of claim 5 containing: from about 0.5 to about 3 weight percent potassium; from about 0.5 to about 15 weight percent monocarboxylate;. from about 0.1 to about 15 weight percent dicarboxylate; from about 0.05 to about 1 weight percent triazole; from 0 to about 0.5 weight percent silicate; from 0 to about 3 weight percent phosphate; from 0 to about 2 weight percent borate; and from 0 to about 0.5 weight percent nitrate.

7. A heat transfer composition comprising the antifreeze of claim 5 and heat transfer fluid distinct from the freezing point depressant.

8. A heat transfer composition comprising heat transfer fluid and a corrosion inhibiting amount of the composition of claim 1.

9. The heat transfer composition of claim 8 containing: from about 0.1 to about 1 weight percent potassium; from about 0.1 to about 10 weight percent monocarboxylate; from about 0.01 to about 10 weight percent dicarboxylate; from about 0.01 to about 0.5 weight percent triazole; from about 0.02 to about 0.3 weight percent silicate from about 0.05 to about 2 weight percent phosphate from about 0.5 to about 1 percent borate.

10. A process for inhibiting corrosion of metal in contact with heat transfer fluid which comprises including in the fluid the corrosion inhibiting composition of claim 1.

11. A process for inhibiting corrosion of metal in contact with heat transfer fluid which comprises including in the fluid a corrosion inhibiting composition comprising an aqueous solution of about 0.1 to about 15 percent by weight of aliphatic monocarboxylate selected from the group consisting of octanoate, nonanoate, decanoate, undecanoate, dodecanoate, 2-ethylhexanoate or neodecanoate; from about 0.01 to about 15 weight percent hydrocarbyl dicarboxylate selected from the group consisting of suberate, azelate, sebacate, undecanedioate, dodecanedioate, terephthalate, or dicyclopentadiene dicarboxylate; from about 0.01 to about 1 weight percent triazole selected from the group consisting of tolyltriazole or benzotriazole, and one or more, from about 0.02 to about 0.5 weight percent silicate; 0.05 to about 3 weight percent phosphate; and from about 0.05 to about 2 weight percent borate.

12. The process of claim 11 wherein the monocarboxylate is 2-ethylhexanoate, the dicarboxylate is sebacate, and triazole is tolyltriazole.

13. The process of claim 11 wherein the composition contains: other corrosion inhibiting compound; buffer; dye; antifoamant; silicate stabilizer; or other material useful in corrosion inhibitor compositions; and mixtures thereof.

14. The process of claim 13 containing silicate, phosphate, borate, nitrate, dye, antifoamant and silicate stabilizer.

15. The process of claim 11 wherein the composition contains freezing point depressant.

16. A corrosion inhibiting composition comprising a solution containing an effective corrosion inhibiting amount of potassium, 2-ethylhexanoate, sebacate, tolyltriazole, and one or more silicate, phosphate or borate.

* * * * *